United States Patent
Hosoya et al.

(10) Patent No.: US 10,563,599 B2
(45) Date of Patent: Feb. 18, 2020

(54) CONTROL SYSTEM FOR TURBOCHARGED INTERNAL COMBUSTION ENGINE

(71) Applicant: Toyota Jidosha Kabushiki Kaisha, Toyota-shi, Aichi-ken (JP)

(72) Inventors: Takanobu Hosoya, Gotemba (JP); Yasuyuki Irisawa, Susono (JP); Hirofumi Kubota, Mishima (JP); Takashi Tsunooka, Gotemba (JP)

(73) Assignee: Toyota Jidosha Kabushiki Kaisha, Toyota-shi Aichi-ken (JP)

(*) Notice: Subject to any disclaimer, the term of this patent is extended or adjusted under 35 U.S.C. 154(b) by 99 days.

(21) Appl. No.: 15/808,172

(22) Filed: Nov. 9, 2017

(65) Prior Publication Data

US 2018/0128193 A1    May 10, 2018

(30) Foreign Application Priority Data

Nov. 10, 2016 (JP) .................................. 2016-219821

(51) Int. Cl.
| | |
|---|---|
| *F02D 41/00* | (2006.01) |
| *F02D 41/10* | (2006.01) |
| *F02B 37/18* | (2006.01) |
| *F02B 37/22* | (2006.01) |
| *F02D 9/02* | (2006.01) |

(52) U.S. Cl.
CPC ........ *F02D 41/0007* (2013.01); *F02B 37/183* (2013.01); *F02B 37/22* (2013.01); *F02D 9/02* (2013.01); *F02D 41/10* (2013.01); *F02D 2200/0406* (2013.01); *F02D 2200/1002* (2013.01); *F02D 2200/602* (2013.01); *Y02T 10/144* (2013.01)

(58) Field of Classification Search
CPC ........ F02D 41/0007; F02D 41/10; F02D 9/02; F02D 2200/0406; F02D 2200/602; F02D 2200/1002; F02B 37/22; F02B 37/183; Y02T 10/144
USPC .......................................................... 60/600
See application file for complete search history.

(56) References Cited

U.S. PATENT DOCUMENTS

| | | | |
|---|---|---|---|
| 4,893,474 A * | 1/1990 | Miller ..................... | F02B 37/18 60/602 |
| 5,036,663 A * | 8/1991 | Akagi ................... | F02B 37/007 60/600 |

(Continued)

FOREIGN PATENT DOCUMENTS

| | | |
|---|---|---|
| JP | S58048716 A | 3/1983 |
| JP | 2001050038 A | 2/2001 |

*Primary Examiner* — Mark A Laurenzi
*Assistant Examiner* — Edward Bushard
(74) *Attorney, Agent, or Firm* — Dinsmore & Shohl LLP

(57) ABSTRACT

A control system for an internal combustion engine includes an exhaust gas passage, an intake passage, a turbocharger, a bypass passage, a waste gate valve, a turbo bypass valve, a throttle valve, and an electronic control unit. The electronic control unit is configured to control the waste gate valve, the turbo bypass valve, and the throttle valve such that the order of execution of the throttle opening degree increase control and the turbo bypass valve opening degree increase control and the waste gate valve opening degree decrease control is changed depending on the engine load at a point in time when the operation state of the internal combustion engine belongs to the natural aspiration region when the predetermined acceleration request is present.

4 Claims, 8 Drawing Sheets

(56) References Cited

U.S. PATENT DOCUMENTS

| | | | | |
|---|---|---|---|---|
| 7,269,950 B2* | 9/2007 | Pedersen | ............... | F01D 17/14 417/406 |
| 7,363,761 B1* | 4/2008 | Dickerson | ............ | F02B 37/025 60/602 |
| 7,918,090 B2* | 4/2011 | Suzuki | ................ | F02B 37/18 60/602 |
| 2003/0074899 A1* | 4/2003 | Yamaguchi | ........... | F01N 3/2006 60/612 |
| 2005/0247058 A1* | 11/2005 | Pedersen | ............... | F01D 17/14 60/599 |
| 2011/0126812 A1* | 6/2011 | Miyashita | ............ | F01N 13/107 123/703 |

* cited by examiner

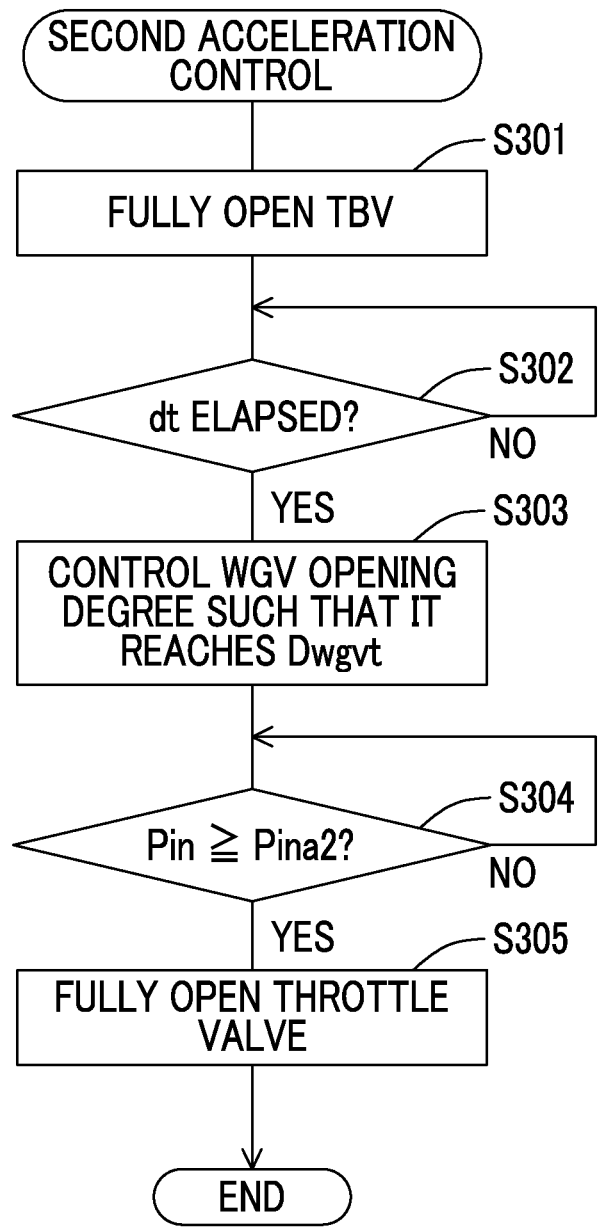

CONTROL SYSTEM FOR TURBOCHARGED INTERNAL COMBUSTION ENGINE

CROSS-REFERENCE TO RELATED APPLICATIONS

This application claims priority to Japanese Patent Application No. 2016-219821 filed on Nov. 10, 2016, which is incorporated herein by reference in its entirety including the specification, drawings and abstract.

BACKGROUND

1. Technical Field

The present disclosure relates to a control system for an internal combustion engine that is provided with a turbocharger.

2. Description of Related Art

In a configuration in which a turbine of a turbocharger is disposed on an exhaust gas passage of an internal combustion engine, a bypass passage bypassing the turbine is disposed on the exhaust gas passage. In addition, a waste gate valve (hereinafter, referred to as a "WGV" in some cases) is disposed on the bypass passage so that the flow rate of the exhaust gas that passes through the turbine is adjusted. The waste gate valve is capable of changing the sectional area of the exhaust gas flow path in the bypass passage.

Japanese Unexamined Patent Application Publication No. 2001-050038 (JP 2001-050038 A) discloses a configuration in which an exhaust gas passage switching valve is disposed in a merging portion for a bypass passage bypassing a turbine and an exhaust gas passage in an internal combustion engine that is provided with a turbocharger. In the configuration that is disclosed in JP 2001-050038 A, the exhaust gas passage switching valve is controlled, such that the turbine side is fully closed and the bypass passage side is fully opened, when an exhaust gas control catalyst disposed on the side of the exhaust gas passage that is downstream of the turbine and downstream of the merging portion of the bypass passage and the exhaust gas passage is inert. As a result of this control, the entire exhaust gas is guided to the exhaust gas control catalyst without passing through the turbine. As a result of the control of the exhaust gas passage switching valve described above, the entire exhaust gas bypasses the turbine with a high heat capacity and flows into the exhaust gas control catalyst. Accordingly, the exhaust gas control catalyst can be activated early.

SUMMARY

In some cases, a turbo bypass valve (hereinafter, referred to as a "TBV" in some cases) capable of changing the sectional area of an exhaust gas flow path passing through a turbine is disposed in addition to a WGV disposed on a bypass passage in a configuration in which the turbine of a turbocharger is disposed on an exhaust gas passage of an internal combustion engine and the bypass passage bypassing the turbine is disposed on the exhaust gas passage. In this case, the TBV is disposed between a portion of the exhaust gas passage from which the bypass passage branches and a portion where the bypass passage merges with the exhaust gas passage (that is, between an upstream side connection portion of the exhaust gas passage connected to the bypass passage and a downstream side connection portion of the exhaust gas passage connected to the bypass passage). In this configuration, the sectional area of the exhaust gas flow path passing through the turbine is directly changed by the opening degree of the TBV being adjusted, and thus the flow rate of the exhaust gas that passes through the turbine can be controlled. Accordingly, the flow rate of the exhaust gas passing through the turbine can be reduced to approximately zero and almost 100% of the exhaust gas can circulate through the bypass passage by the TBV being fully closed.

During an acceleration operation of the internal combustion engine provided with the turbocharger for an operation state of the internal combustion engine to be shifted to a turbocharging region from a natural aspiration region, it is desirable that responsiveness is improved by an intake air amount being more quickly increased to a target air amount depending on a target engine load in the turbocharging region.

The present disclosure provides a control system for an internal combustion engine provided with a turbocharger along with a WGV and a TBV as described above, the control system improving responsiveness during an acceleration operation in which an operation state of the internal combustion engine is shifted to a turbocharging region from a natural aspiration region.

An aspect of the present disclosure relates to a control system for an internal combustion engine. The control system includes an exhaust gas passage of the internal combustion engine; an intake passage of the internal combustion engine; a turbocharger including a turbine disposed on the exhaust gas passage and a compressor disposed on the intake passage; a bypass passage branching from the exhaust gas passage at a portion located upstream of the turbine and merging with the exhaust gas passage at a portion located downstream of the turbine; a waste gate valve disposed on the bypass passage, the waste gate valve being configured to change a sectional area of an exhaust gas flow path in the bypass passage; a turbo bypass valve disposed in the exhaust gas passage between a portion where the bypass passage branches from the exhaust gas passage and a portion where the bypass passage merges with the exhaust gas passage, the turbo bypass valve being configured to change a sectional area of an exhaust gas flow path in the exhaust gas passage passing through the turbine; a throttle valve disposed on the intake passage and provided downstream of the compressor, the throttle valve being configured to change a sectional area of an intake air flow path in the intake passage; and an electronic control unit configured to control an opening degree of the throttle valve such that the opening degree of the throttle valve increases to a target throttle opening degree in a turbocharging region, control an opening degree of the waste gate valve such that the opening degree of the waste gate valve decreases to a target waste gate valve opening degree in the turbocharging region, and control an opening degree of the turbo bypass valve such that the opening degree of the turbo bypass valve increases to a target turbo bypass valve opening degree in the turbocharging region when a predetermined acceleration request is present for an operation state of the internal combustion engine to be shifted from a natural aspiration region to the turbocharging region, the natural aspiration region being an operation region where an engine load is equal to or lower than a first predetermined load and a natural aspiration operation being performed in the natural aspiration region and the turbocharging region being an operation region where the engine load is higher than the first predetermined load and a turbocharging operation being performed in the turbocharging region, control the opening degree of the waste gate valve such that the opening degree of the waste gate valve decreases to the target waste gate valve opening degree in the turbocharging region and control the opening degree of the turbo bypass valve such that the opening degree of the turbo bypass valve increases to the target turbo bypass valve opening degree in the turbocharging region after controlling the opening degree of the throttle valve such that the opening degree of the throttle valve increases to the target throttle opening degree in a case where the operation state of the internal combustion engine is shifted to the turbocharging region from a region where the engine load in the natural aspiration region is equal to or lower than a second predetermined load lower than the first predetermined load when the predetermined acceleration request is present, and control the opening degree of the throttle valve such that the opening degree of the throttle valve increases to the target throttle opening degree after controlling the opening degree of the waste gate valve such that the opening degree of the waste gate valve decreases to the target waste gate valve opening degree in the turbocharging region and controlling the opening degree of the turbo bypass valve such that the opening degree of the turbo bypass valve increases to the target turbo bypass valve opening degree in the turbocharging region in a case where the operation state of the internal combustion engine is shifted to the turbocharging region from a region where the engine load in the natural aspiration region is higher than the second predetermined load.

According to the aspect of the present disclosure, a throttle opening degree increase control causing an intake air amount to increase and a WGV opening degree decrease control and a TBV opening degree increase control causing a turbocharging pressure (pressure of intake air on a side that is upstream of the throttle valve) to rise are executed by a valve control unit when the predetermined acceleration request is present for the operation state of the internal combustion engine to be shifted from the natural aspiration region to the turbocharging region. The target throttle opening degree as a target throttle valve opening degree during the throttle opening degree increase control, a target WGV opening degree as a target WGV opening degree during the WGV opening degree decrease control, and a target TBV opening degree as a target TBV opening degree during the TBV opening degree increase control at this time are set based on the requested operation state in the turbocharging region. According to the aspect of the present disclosure, the order of execution of the throttle opening degree increase control and the TBV opening degree increase and WGV opening degree decrease controls is changed depending on the engine load at a point in time when the operation state of the internal combustion engine belongs to the natural aspiration region when the predetermined acceleration request is present.

More specifically, according to the aspect of the present disclosure, the valve control unit executes the TBV opening degree increase control and the WGV opening degree decrease control after executing the throttle opening degree increase control in a case where the operation state of the internal combustion engine is shifted to the turbocharging region from the region where the engine load in the natural aspiration region is equal to or lower than the second predetermined load lower than the first predetermined load (hereinafter, referred to as a "first natural aspiration region" in some cases) when the predetermined acceleration request is present. When the operation state of the internal combustion engine belongs to the first natural aspiration region, the intake air amount is relatively small. Accordingly, the flow rate of the exhaust gas discharged from the internal combustion engine is relatively low. In this state, a quick increase in turbocharging pressure is not easy even if the ratio of the exhaust gas passing through the turbine to the exhaust gas discharged from the internal combustion engine is increased by the opening degree of the TBV being increased and the opening degree of the WGV being decreased. Accordingly, when the operation state of the internal combustion engine belongs to the first natural aspiration region, the intake air amount is likely to increase more quickly in a case where the opening degree of the throttle valve is increased than in a case where the turbocharging pressure is raised by the opening degree of the TBV being increased and the opening degree of the WGV being decreased.

Accordingly, in a case where the operation state of the internal combustion engine is shifted from the first natural aspiration region to the turbocharging region, the intake air amount can be increased more quickly to a target air amount depending on a target engine load in the turbocharging region in a case where the intake air amount is increased to some extent by the execution of the throttle opening degree increase control and then the turbocharging pressure is raised by the execution of the TBV opening degree increase control and the WGV opening degree decrease control than in a case where the TBV opening degree increase control and the WGV opening degree decrease control are executed before the execution of the throttle opening degree increase control.

According to the aspect of the present disclosure, the valve control unit executes the throttle opening degree increase control after executing the TBV opening degree increase control and the WGV opening degree decrease control in a case where the operation state of the internal combustion engine is shifted to the turbocharging region from the region where the engine load in the natural aspiration region is higher than the second predetermined load (hereinafter, referred to as a "second natural aspiration region" in some cases) when the predetermined acceleration request is present. When the operation state of the internal combustion engine belongs to the second natural aspiration region, the opening degree of the throttle valve is already relatively high and the intake air amount is already relatively large. In this state, the ratio of an increment in intake air amount to an increment in throttle valve opening degree is low. In other words, a quick increase in intake air amount is not easy even if the opening degree of the throttle valve is increased. In addition, when the operation state of the internal combustion engine belongs to the second natural aspiration region, the intake air amount is relatively large, and thus the flow rate of the exhaust gas discharged from the internal combustion engine is relatively high. In this state, the turbocharging pressure is likely to rise quickly in a case where the ratio of the exhaust gas passing through the turbine to the exhaust gas discharged from the internal combustion engine is increased by the opening degree of the TBV being increased and the opening degree of the WGV being decreased. Accordingly, when the operation state of the internal combustion engine belongs to the second natural aspiration region, the intake air amount is likely to increase more quickly in a case where the turbocharging pressure is raised by the opening degree of the TBV being increased and the opening degree of the WGV being decreased than in a case where the opening degree of the throttle valve is increased.

Accordingly, in a case where the operation state of the internal combustion engine is shifted from the second natural aspiration region to the turbocharging region, the intake air amount can be increased more quickly to the target air amount depending on the target engine load in the turbocharging region in a case where the intake air amount is further increased by the execution of the throttle opening degree increase control after the turbocharging pressure is raised to some extent by the TBV opening degree increase control and the WGV opening degree decrease control being executed than in a case where the TBV opening degree increase control and the WGV opening degree decrease control are executed after the execution of the throttle opening degree increase control.

According to the aspect of the present disclosure, the intake air amount can be more quickly increased to the target air amount by the order of execution of the throttle opening degree increase control and the TBV opening degree increase and WGV opening degree decrease controls being changed depending on the engine load at a point in time when the operation state of the internal combustion engine belongs to the natural aspiration region when the predetermined acceleration request is present as described above. Accordingly, responsiveness during the acceleration operations in which the operation state of the internal combustion engine is shifted from the natural aspiration regions to the turbocharging region can be improved.

In the control system according to the aspect of the present disclosure, the electronic control unit may be configured to control the opening degree of the waste gate valve such that the opening degree of the waste gate valve reaches the target waste gate valve opening degree after fully closing the waste gate valve temporarily in a case where the operation state of the internal combustion engine is shifted to the turbocharging region from the region where the engine load in the natural aspiration region is equal to or lower than the second predetermined load when the predetermined acceleration request is present. According to the aspect of the present disclosure, the turbocharging pressure can be raised as quickly as possible by the WGV being fully closed. Accordingly, the turbocharging pressure can be raised more quickly to a target turbocharging pressure by the opening degree of the WGV being controlled such that the opening degree of the WGV reaches the target WGV opening degree after the WGV is fully closed temporarily.

When the operation state of the internal combustion engine belongs to the second natural aspiration region, the intake air amount is relatively large as described above, and thus the flow rate of the exhaust gas discharged from the internal combustion engine is relatively high. Once the WGV is fully closed temporarily in this state, the turbocharging pressure may rise to excess temporarily. As a result, the intake air amount may rise to excess temporarily when the opening degree of the throttle valve is increased. Accordingly, temporary full closing of the WGV preceding controlling of the WGV opening degree for the WGV opening degree to reach the target WGV opening degree during the WGV opening degree decrease control at a time when the predetermined acceleration request is present may be limited to a case where the operation state of the internal combustion engine is shifted to the turbocharging region from the second natural aspiration region.

A decrease in WGV opening degree preceding an increase in TBV opening degree in a case where the valve control unit executes the TBV opening degree increase control and the WGV opening degree decrease control when the predetermined acceleration request is present may cause the pressure of the exhaust gas on the side of the exhaust gas passage that is upstream of the portion from which the bypass passage branches to temporarily rise to excess. In the control system according to the aspect of the present disclosure, the electronic control unit may simultaneously execute the control causing the opening degree of the waste gate valve to decrease to the target waste gate valve opening degree in the turbocharging region and the control causing the opening degree of the turbo bypass valve to increase to the target turbo bypass valve opening degree in the turbocharging region when the predetermined acceleration request is present. According to the aspect of the present disclosure, an excessive rise in the pressure of the exhaust gas on the side of the exhaust gas passage that is upstream of the portion from which the bypass passage branches can be suppressed.

In the control system according to the aspect of the present disclosure, the electronic control unit may control the opening degree of the waste gate valve such that the opening degree of the waste gate valve decreases to the target waste gate valve opening degree in the turbocharging region after controlling the opening degree of the turbo bypass valve such that the opening degree of the turbo bypass valve increases to the target turbo bypass valve opening degree in the turbocharging region when the predetermined acceleration request is present.

According to the aspect of the present disclosure, responsiveness during an acceleration operation in which an operation state of an internal combustion engine is shifted to a turbocharging region from a natural aspiration region can be improved in the internal combustion engine provided with a turbocharger along with a WGV and a TBV.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 9 is a flowchart illustrating a control flow of a second acceleration control according to the example.

DETAILED DESCRIPTION OF EMBODIMENTS

Hereinafter, a specific embodiment of the present disclosure will be described based on accompanying drawings. The dimensions, materials, shapes, relative dispositions, and so on of components in the following description of the present embodiment do not limit the technical scope of the present disclosure even if not specifically mentioned.

Example: Schematic Configuration

Figure 1:
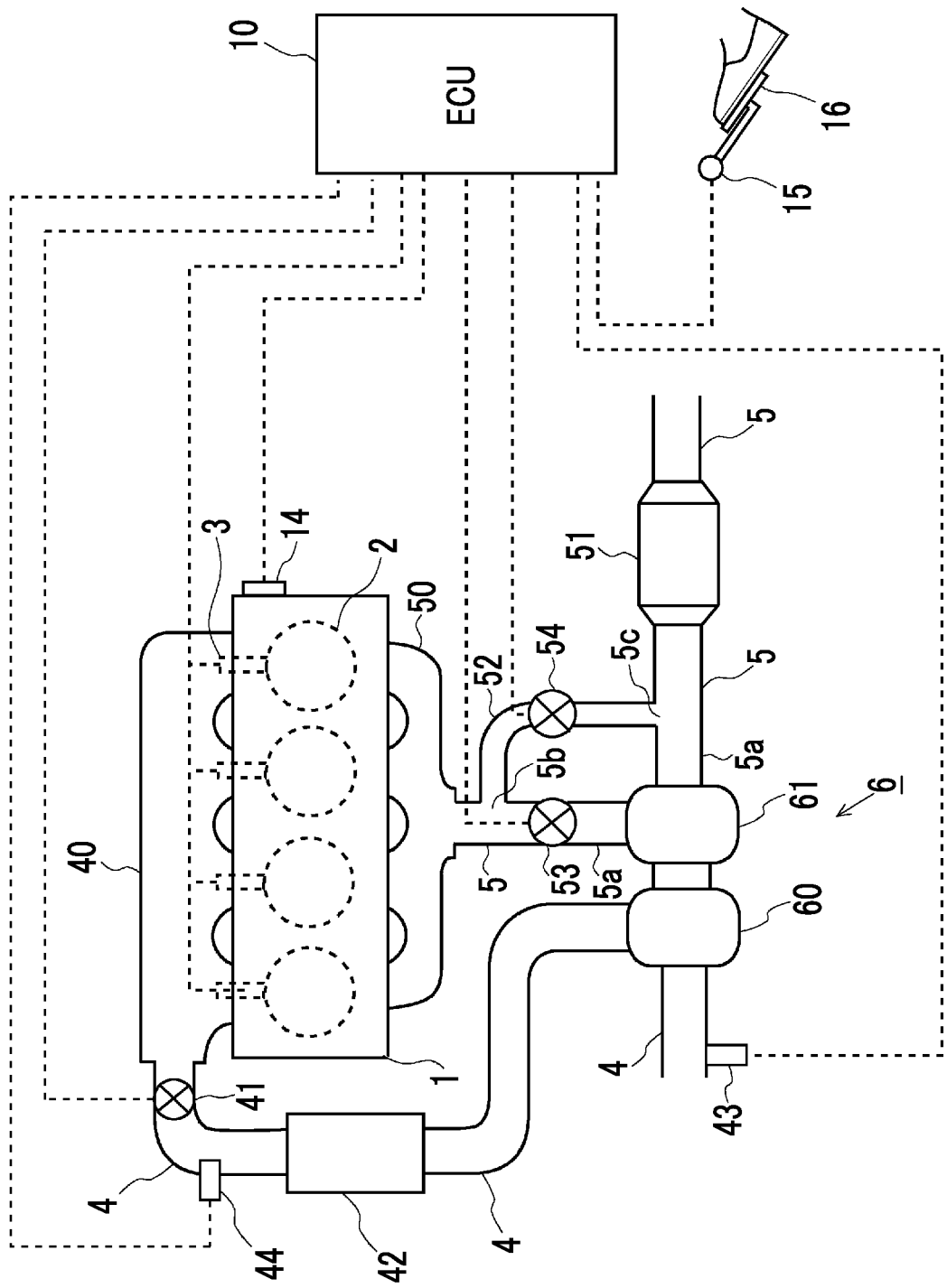
FIG. 1 is a diagram illustrating a schematic configuration of an internal combustion engine according to an example and a schematic configuration of an intake and exhaust system of the internal combustion engine.

FIG. 1 is a diagram illustrating a schematic configuration of an internal combustion engine according to the present example and a schematic configuration of an intake and exhaust system of the internal combustion engine. An internal combustion engine 1 illustrated in FIG. 1 is a spark ignition-type internal combustion engine (gasoline engine) that is provided with a cylinder group which includes four cylinders 2. Fuel injection valves 3 are disposed in the internal combustion engine 1, and the fuel injection valves 3 inject a fuel into respective intake ports. The fuel injection valves 3 may be configured to inject the fuel directly into the respective cylinders 2 as well. Spark plugs (not illustrated) for igniting air-fuel mixtures in the cylinders are attached to the respective cylinders 2.

The internal combustion engine 1 is connected to an intake manifold 40 and an exhaust manifold 50. An intake passage 4 is connected to the intake manifold 40. A compressor 60 of a turbocharger 6, which is operated by the energy of exhaust gas being used as a drive source, is disposed in the middle of the intake passage 4. An intercooler 42, which performs heat exchange between intake air and outside air, is disposed on the intake passage 4 and provided downstream of the compressor 60. A throttle valve 41 is disposed on the intake passage 4 and provided downstream of the intercooler 42. The throttle valve 41 adjusts the amount of the air taken into the internal combustion engine 1 by changing the sectional area of the intake air flow path in the intake passage 4. A pressure sensor 44 is disposed on the intake passage 4 and provided upstream of the throttle valve 41. The pressure sensor 44 outputs an electric signal depending on the pressure of the intake air on the side that is upstream of the throttle valve 41 (that is, a turbocharging pressure). An air flow meter 43 is disposed on the intake passage 4 and provided upstream of the compressor 60. The air flow meter 43 outputs an electric signal depending on the amount (mass) of the intake air (air) flowing through the intake passage 4.

A turbine 61 of the turbocharger 6 is disposed in the middle of an exhaust gas passage 5. An exhaust gas control catalyst 51 is disposed on the exhaust gas passage 5 and provided downstream of the turbine 61. Examples of the exhaust gas control catalyst 51 can include an oxidation catalyst and a three-way catalyst. A bypass passage 52 is disposed on the exhaust gas passage 5. The bypass passage 52 bypasses the turbine 61. The bypass passage 52 branches from a branching portion 5b of the exhaust gas passage 5, which is provided upstream of the turbine 61, and merges with a merging portion 5c of the exhaust gas passage 5, which is provided downstream of the turbine 61 and upstream of the exhaust gas control catalyst 51. The section of the exhaust gas passage 5 that reaches the merging portion 5c through the turbine 61 from the branching portion 5b will be referred to as a turbine side exhaust gas passage 5a. A turbo bypass valve (TBV) 53 is disposed in the section of the turbine side exhaust gas passage 5a that is provided between the branching portion 5b and the turbine 61. A waste gate valve (WGV) 54 is disposed on the bypass passage 52. The TBV 53 adjusts the flow rate of the exhaust gas passing through the turbine 61 by changing the sectional area of the flow path for the exhaust gas flowing through the turbine side exhaust gas passage 5a (that is, the exhaust gas passing through the turbine 61). The WGV 54 adjusts the flow rate of the exhaust gas flowing through the bypass passage 52 by changing the sectional area of the exhaust gas flow path in the bypass passage 52. The TBV 53 may be disposed in the section of the turbine side exhaust gas passage 5a that is provided between the turbine 61 and the merging portion 5c.

An electronic control unit (ECU) 10 is disposed in the internal combustion engine 1. The ECU 10 is a unit that controls operation states of the internal combustion engine 1 and the like. Various sensors such as a crank position sensor 14 and an accelerator position sensor 15 as well as the air flow meter 43 and pressure sensor 44 are electrically connected to the ECU 10. The crank position sensor 14 is a sensor that outputs an electric signal which correlates with the rotational position of an engine output shaft (crankshaft) of the internal combustion engine 1. The accelerator position sensor 15 is a sensor that outputs an electric signal which correlates with the amount by which an accelerator pedal 16 of a vehicle in which the internal combustion engine 1 is mounted is operated (accelerator operation amount). The signals output by the above-described sensors are input to the ECU 10. The ECU 10 derives the engine rotation speed of the internal combustion engine 1 based on a value detected by the crank position sensor 14 and derives the engine load of the internal combustion engine 1 based on a value detected by the accelerator position sensor 15. In addition, the ECU 10 estimates the flow rate of the exhaust gas discharged from the internal combustion engine 1 (that is, the flow rate of the exhaust gas passing through the exhaust gas control catalyst 51) based on a value detected by the air flow meter 43.

Various equipment such as the fuel injection valves 3, the throttle valve 41, the TBV 53, and the WGV 54 are electrically connected to the ECU 10. The ECU 10 controls the various equipment based on the values detected by the sensors described above. In other words, the respective opening degrees of the throttle valve 41, the TBV 53, and the WGV 54 are controlled by the ECU 10. In the present example, the ECU 10 is an example of a "valve control unit".

Figure 2:
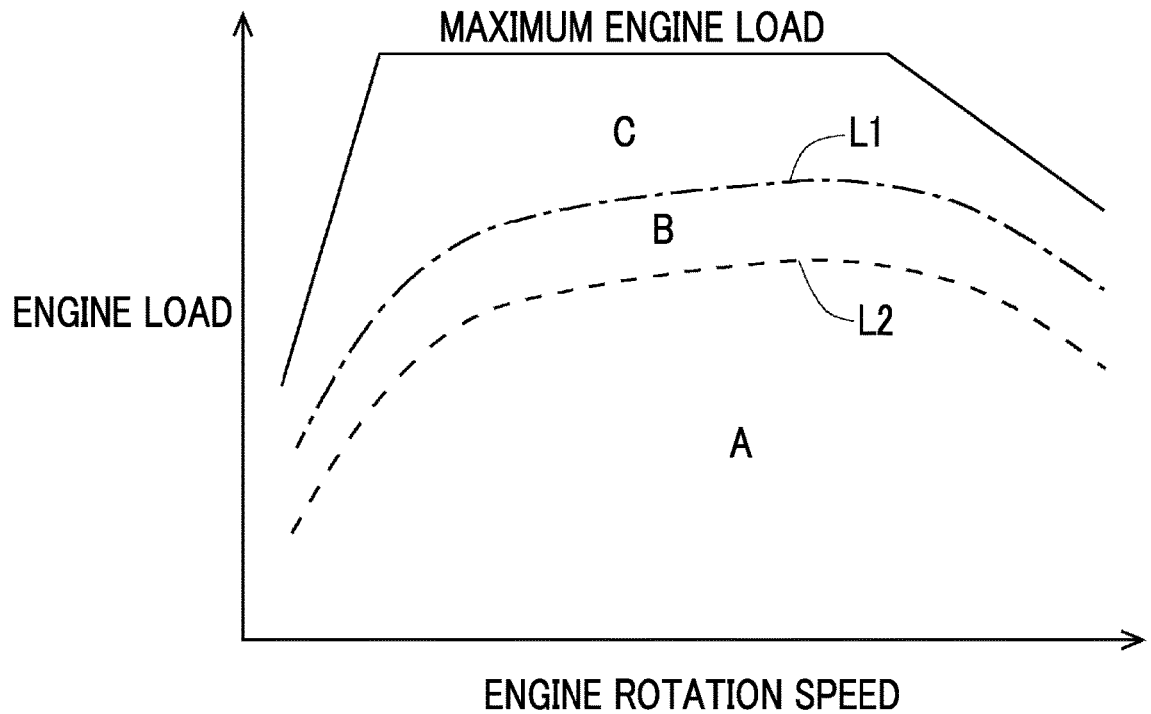
FIG. 2 is a diagram illustrating a correlation of an operation state of the internal combustion engine according to the example with a natural aspiration region and a turbocharging region.

In the internal combustion engine 1 according to the present example, a natural aspiration operation and a turbocharging operation are selectively performed by the opening degrees of the throttle valve 41, the TBV 53, and the WGV 54 being controlled depending on the operation state of the internal combustion engine 1. FIG. 2 is a diagram illustrating a correlation of the operation state of the internal combustion engine 1 with a natural aspiration region and a turbocharging region. The natural aspiration region is an operation region in which the natural aspiration operation is performed. The turbocharging region is an operation region in which the turbocharging operation is performed. The horizontal axis in FIG. 2 represents the engine rotation speed of the internal combustion engine 1. The vertical axis in FIG. 2 represents the engine load of the internal combustion engine 1.

The line L1 that is illustrated in FIG. 2 represents a first predetermined load, which is a boundary between the natural aspiration region and the turbocharging region. The first predetermined load corresponds to the maximum engine load in the natural aspiration operation. In other words, regions A, B, where the engine load does not exceed the first predetermined load, constitute the natural aspiration region and a region C, where the engine load exceeds the first predetermined load, is the turbocharging region. In the present example, the natural aspiration region is divided into the region A and the region B, which share, as their boundary, a second predetermined load that is lower than the first predetermined load (examples of the second predetermined load including an engine load that is approximately 70% of the first predetermined load). The line L2 that is illustrated in FIG. 2 represents the second predetermined load. The natural aspiration region where the engine load does not exceed the second predetermined load, that is, the region A, is a first natural aspiration region. The natural aspiration region where the engine load exceeds the second predetermined load (region close to the turbocharging region C), that is, the region B, is a second natural aspiration region.

Figure 3:
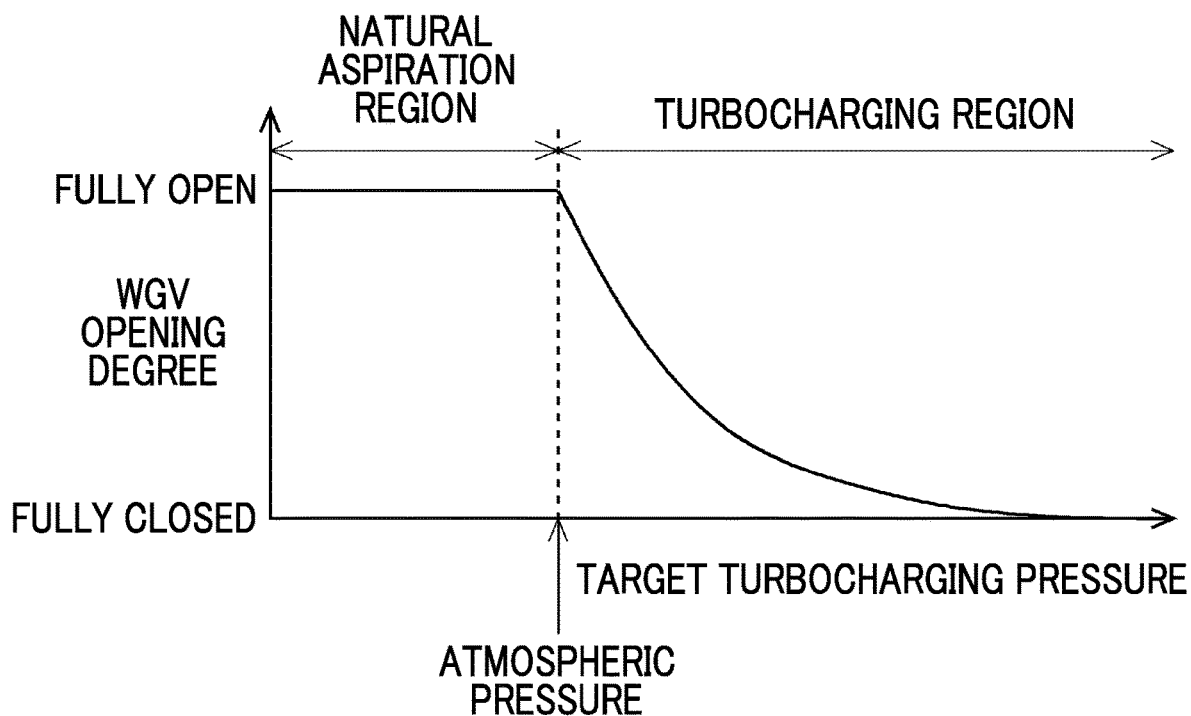
FIG. 3 is a diagram illustrating a correlation between a target turbocharging pressure and a WGV opening degree according to the example.

When the operation state of the internal combustion engine 1 belongs to the natural aspiration regions A, B, the natural aspiration operation is performed by the WGV 54 being controlled such that it is put into a fully open state and the opening degree of the TBV 53 (hereinafter, referred to as a "TBV opening degree" in some cases) and the opening degree of the throttle valve 41 (hereinafter, referred to as a "throttle opening degree" in some cases) being controlled such that they reach opening degrees depending on a requested operation state. For example, the TBV 53 is controlled such that it is put into a fully closed state when the operation state of the internal combustion engine 1 belongs to the first natural aspiration region A, the temperature of the exhaust gas control catalyst 51 is lower than its activation temperature, and the exhaust gas control catalyst 51 needs to be warmed up. As a result, the entire exhaust gas bypasses the turbine 61, which has a high heat capacity, and flows into the exhaust gas control catalyst 51. Accordingly, the exhaust gas control catalyst 51 can be warmed up early by the thermal energy of the exhaust gas. When the engine load of the internal combustion engine 1 is the first predetermined load, which is the upper limit load in the second natural aspiration region B, the WGV 54, the TBV 53, and the throttle valve 41 are controlled such that they are fully opened without exception. When the operation state of the internal combustion engine 1 belongs to the turbocharging region C, the turbocharging operation is performed by the throttle valve 41 and the TBV 53 being controlled such that they are fully opened and the opening degree of the WGV 54 (hereinafter, referred to as a "WGV opening degree" in some cases) being controlled such that it reaches an opening degree depending on a target turbocharging pressure and lower than that at full opening. FIG. 3 is a diagram illustrating a correlation between the target turbocharging pressure and the WGV opening degree. The horizontal axis in FIG. 3 represents the target turbocharging pressure. The vertical axis in FIG. 3 represents the WGV opening degree. In the turbocharging region, where the target turbocharging pressure is higher than the atmospheric pressure, the WGV opening degree decreases as the target turbocharging pressure increases as illustrated in FIG. 3.

Valve Control during Acceleration Operation

Control of the opening degrees of the throttle valve 41, the TBV 53, and the WGV 54 during acceleration operations in which the operation state of the internal combustion engine 1 is shifted from the natural aspiration regions A, B to the turbocharging region C will be described below. During the acceleration operations, the opening degrees of the respective valves 41, 53, 54 are controlled such that the engine load is raised more quickly to a target engine load in the turbocharging region C.

Figure 4:
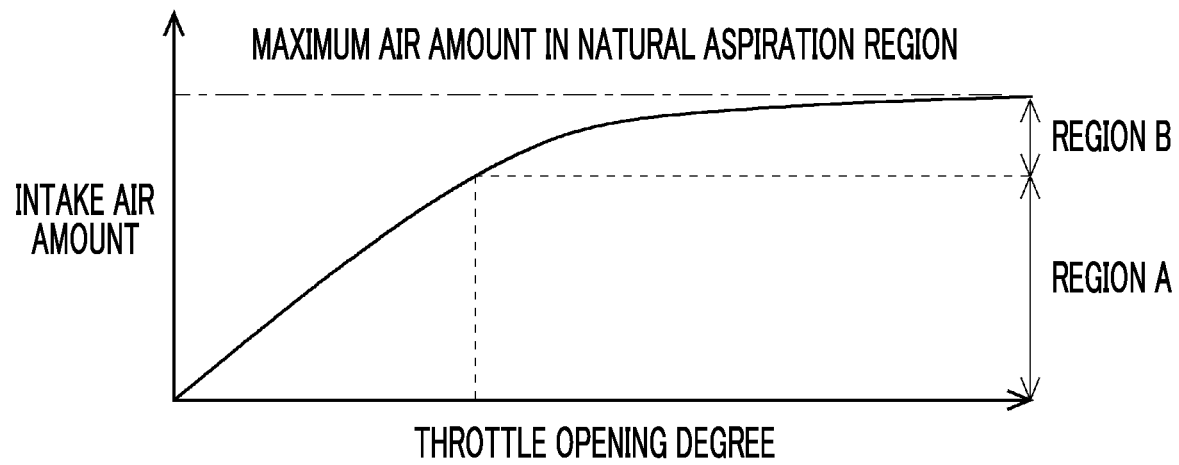
FIG. 4 is a diagram illustrating a correlation between a throttle opening degree and an intake air amount in the internal combustion engine according to the example.

The control of the opening degrees of the respective valves 41, 53, 54 during the acceleration operation in which the operation state of the internal combustion engine 1 is shifted from the first natural aspiration region A to the turbocharging region C will be described first. In the following description, the control of the opening degrees of the respective valves 41, 53, 54 during the acceleration operation at this time will be referred to as a "first acceleration control" in some cases. FIG. 4 is a diagram illustrating a correlation between the throttle opening degree and the intake air amount in the internal combustion engine 1. The horizontal axis in FIG. 4 represents the throttle opening degree and the vertical axis in FIG. 4 represents the intake air amount in the internal combustion engine 1. The ratio of an increment in intake air amount to an increment in throttle opening degree is higher in the first natural aspiration region A, where the throttle opening degree is relatively low and the intake air amount is relatively small, than in the second natural aspiration region B as illustrated in FIG. 4. When the operation state of the internal combustion engine 1 belongs to the first natural aspiration region A, the intake air amount is relatively small, and thus the flow rate of the exhaust gas is relatively low. In this case, a quick increase in the rotation speed of the turbine 61 is not easy even if the ratio of the exhaust gas passing through the turbine 61 to the exhaust gas discharged from the internal combustion engine 1 is increased by the TBV 53 being fully opened and the WGV opening degree being decreased. In other words, a quick rise in turbocharging pressure is not easy. Accordingly, when the operation state of the internal combustion engine 1 belongs to the first natural aspiration region A, the intake air amount is likely to increase more quickly in a case where the throttle opening degree is increased than in a case where the turbocharging pressure is raised by the TBV opening degree being increased and the WGV opening degree being decreased.

During the first acceleration control, the intake air amount is increased to some extent first by the throttle valve 41 being put into the fully open state by a throttle opening degree increase control that results in an increase in throttle opening degree. After the intake air amount is increased to some extent, the TBV 53 is put into the fully open state by a TBV opening degree increase control that results in an increase in TBV opening degree and the turbocharging pressure is raised by a WGV opening degree decrease control that results in a decrease in WGV opening degree being executed. By the opening degrees of the respective valves 41, 53, 54 being controlled in this order, the intake air amount can be increased more quickly to a target air amount depending on the target engine load in the turbocharging region C. Accordingly, the engine load can be raised more quickly to the target engine load in the turbocharging region C.

Figure 5:
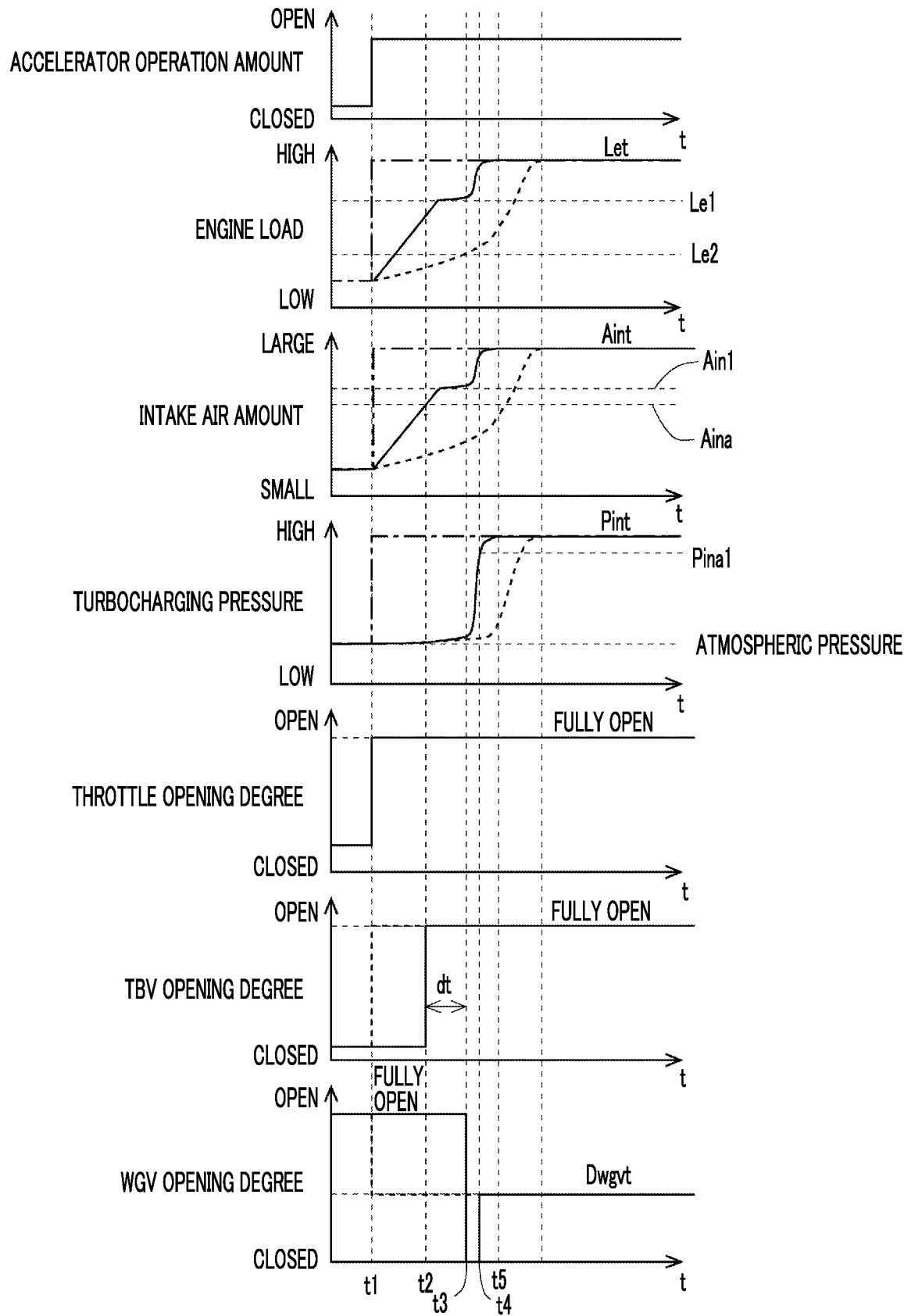
FIG. 5 is a time chart illustrating transitions of an accelerator operation amount, an engine load, the intake air amount, a turbocharging pressure, and each valve opening degree during an acceleration operation in which the operation state of the internal combustion engine according to the example is shifted from a first natural aspiration region to the turbocharging region.

Hereinafter, the control of the opening degrees of the respective valves 41, 53, 54 during the first acceleration control will be described in detail based on FIG. 5. FIG. 5 is a time chart illustrating transitions of the accelerator operation amount, the engine load, the intake air amount, the turbocharging pressure, and the opening degrees of the respective valves 41, 53, 54 during the acceleration operation in which the operation state of the internal combustion engine 1 is shifted from the first natural aspiration region A to the turbocharging region C. The solid lines in FIG. 5 show the transitions of the respective parameters during the execution of the first acceleration control according to the present example. The dashed lines in FIG. 5 show transitions of the respective parameters in a case where the throttle opening degree increase control, the TBV opening degree increase control, and the WGV opening degree decrease control are simultaneously executed unlike in the first acceleration control. The one-dot chain lines that are illustrated in FIG. 5 in relation to the engine load, the intake air amount, and the turbocharging pressure show transitions of the target engine load, the target air amount, and the target turbocharging pressure, respectively.

Before time t1 in FIG. 5, the operation state of the internal combustion engine 1 belongs to the first natural aspiration region A. At this time, the throttle opening degree and the TBV opening degree remain controlled such that they are opening degrees depending on the operation state of the internal combustion engine 1. In addition, the WGV 54 remains controlled such that it is in the fully open state. At time t1, the accelerator operation amount detected by the accelerator position sensor 15 increases and the acceleration operation is called for. As a result, a target engine load Let exceeds a first predetermined load Le1. In other words, the target engine load Let is shifted to the turbocharging region C. As a result, a target air amount Aint and a target turbocharging pressure Pint increase to values corresponding to the target engine load Let in the turbocharging region as well.

During the first acceleration control, the throttle valve 41 is controlled at time t1 such that it is put into the fully open state. By the throttle opening degree being increased, both the intake air amount and the engine load begin to gradually increase at time t1. Then, once the intake air amount reaches a predetermined air amount threshold Aina at time t2, the TBV 53 is controlled and its state is changed from the fully closed state to the fully open state. The predetermined air amount threshold Aina is smaller than a first predetermined air amount Ain1 and the first predetermined air amount Ain1 corresponds to the first predetermined load Le1 (examples of the predetermined air amount threshold Aina including 80% of the first predetermined air amount Ain1).

At time t2, the WGV 54 maintains its fully open state. Accordingly, the turbocharging pressure rarely rises immediately after time t2. Accordingly, once the intake air amount reaches the first predetermined air amount Ain1 after time t2, the intake air amount temporarily maintained at the first predetermined air amount Ain1. In addition, once the engine load reaches the first predetermined load Le1 after time t2, the engine load is temporarily maintained at the first predetermined load Le1. At time t3, which is a point in time that is reached after a predetermined period dt elapses from time t2, the WGV 54 is controlled and its state is temporarily changed from the fully open state to a fully closed state. At time t3, the rotation speed of the turbine 61 is quickly raised by the energy of the exhaust gas by the WGV 54 being controlled and put into the fully closed state in a state where the intake air amount reaches the first predetermined air amount Ain1. Accordingly, the turbocharging pressure begins to soar at time t3. As the turbocharging pressure soars, the intake air amount and the engine load soar as well.

Once the soaring turbocharging pressure reaches a first predetermined turbocharging pressure threshold Pina1 at time t4, the WGV 54 is opened and the opening degree of the WGV 54 is controlled such that it reaches a target WGV opening degree Dwgvt. The first predetermined turbocharging pressure threshold Pina1 is lower than the target turbocharging pressure Pint (examples of the first predetermined turbocharging pressure threshold Pina1 including 90% of the target turbocharging pressure Pint) and the target WGV opening degree Dwgvt corresponds to the target turbocharging pressure Pint. As a result, the turbocharging pressure, the intake air amount, and the engine load reach the target turbocharging pressure Pint, the target air amount Aint, and the target engine load Let in turbocharging region C at time t5, respectively.

In a case where the operation state of the internal combustion engine 1 is shifted from the first natural aspiration region A to the turbocharging region C as described above, the engine load can be more quickly increased to the target engine load Let in the turbocharging region C in a case where the intake air amount is increased to some extent by the execution of the throttle opening degree increase control and then the turbocharging pressure is raised by the execution of the TBV opening degree increase control and the WGV opening degree decrease control than in a case where the TBV opening degree increase control and the WGV opening degree decrease control are executed before the execution of the throttle opening degree increase control.

In a case where the TBV 53 is controlled such that it is put into the fully open state and the WGV opening degree is decreased to the target WGV opening degree Dwgvt at the same time as the throttle valve 41 is controlled such that it is put into the fully open state at time t1 as illustrated by the dashed lines in FIG. 5, the pressure of the exhaust gas on the side of the exhaust gas passage 5 that is upstream of the branching portion 5b is higher than in a case where the WGV 54 maintains its fully open state at time t1 (solid line in FIG. 5). As a result, the intake air is less likely to flow into the cylinders 2. Accordingly, a quick increase in intake air amount is not easy although the throttle valve 41 is controlled such that it is put into the fully open state. Accordingly, the rate of increase in intake air amount after time t1 is lower than in a case where the throttle valve 41 is controlled such that it is put into the fully open state with the WGV 54 maintaining its fully open state as in the first acceleration control according to the present example. In addition, the turbocharging pressure rarely rises until the intake air amount increases to some extent although the WGV opening degree is decreased to the target WGV opening degree Dwgvt at time t1. Accordingly, it takes time for the turbocharging pressure to begin to rise. As a result, it takes time for the intake air amount to reach the target air amount Aint in the turbocharging region C and for the engine load to reach the target engine load Let in the turbocharging region C. Accordingly, with the first acceleration control according to the present example, the engine load can be more quickly increased to the target engine load Let in the turbocharging region C than in a case where the TBV 53 is controlled such that it is put into the fully open state and the WGV opening degree is decreased to the target WGV opening degree Dwgvt at the same time as the throttle valve 41 is controlled such that it is put into the fully open state at time t1.

During the first acceleration control according to the present example, the TBV 53 is controlled at time t2 such that it is put into the fully open state and the WGV 54 is controlled at time t3, which is reached after the predetermined period dt elapses from time t2, such that it is put into the fully closed state as described above. In other words, the WGV opening degree decrease control is executed after the TBV opening degree increase control. However, the order of the execution of the controls is not limited to the above-described order. Still, a decrease in WGV opening degree preceding an increase in TBV opening degree may cause the pressure of the exhaust gas on the side of the exhaust gas passage 5 that is upstream of the branching portion 5b to temporarily rise to excess. From the viewpoint of suppressing such an excessive rise in exhaust gas pressure, in some embodiments the TBV opening degree increase control and the WGV opening degree decrease control are simultaneously executed or the WGV opening degree decrease control is executed after the TBV opening degree increase control as described above during the first acceleration control.

During the first acceleration control according to the present example, the WGV 54 is controlled at time t3 such that it temporarily remains in the fully closed state before the WGV opening degree reaches the target WGV opening degree Dwgvt at time t4, when the turbocharging pressure reaches the first predetermined turbocharging pressure threshold Pina1, as described above. Alternatively, the WGV opening degree may be controlled at time t3 during the first acceleration control such that it reaches the target WGV opening degree Dwgvt. Even in this case, the turbocharging pressure can be raised to the target turbocharging pressure Pint after time t3. However, the turbocharging pressure can be raised as quickly as possible when the WGV 54 is controlled at time t3 such that it temporarily remains in the fully closed state. As a result, the engine load can be more quickly increased to the target engine load Let in the turbocharging region C.

Hereinafter, the control of the opening degrees of the respective valves 41, 53, 54 during the acceleration operation in which the operation state of the internal combustion engine 1 is shifted from the second natural aspiration region B to the turbocharging region C will be described. In the following description, the control of the opening degrees of the respective valves 41, 53, 54 during the acceleration operation at this time will be referred to as a "second acceleration control" in some cases. The ratio of an increment in intake air amount to an increment in throttle opening degree is lower in the second natural aspiration region B, where the throttle opening degree is relatively high and the intake air amount is relatively large, than in the first natural aspiration region A as illustrated in FIG. 4. When the operation state of the internal combustion engine 1 belongs to the second natural aspiration region B, the intake air amount is relatively large, and thus the flow rate of the exhaust gas is relatively high. In this case, the rotation speed of the turbine 61 is likely to rise quickly once the ratio of the exhaust gas passing through the turbine 61 to the exhaust gas discharged from the internal combustion engine 1 is increased by the TBV 53 being fully opened and the WGV opening degree being decreased. In other words, the turbocharging pressure is likely to rise quickly. Accordingly, when the operation state of the internal combustion engine 1 belongs to the second natural aspiration region B, the intake air amount is likely to increase more quickly in a case where the turbocharging pressure is raised by the TBV opening degree being increased and the WGV opening degree being decreased than by the throttle opening degree being increased.

During the second acceleration control, the turbocharging pressure is raised to some extent first by the TBV 53 being put into the fully open state by the TBV opening degree increase control that results in an increase in TBV opening degree and the WGV opening degree decrease control that results in a decrease in WGV opening degree being executed. After the turbocharging pressure is increased to some extent, the intake air amount is further increased by the throttle valve 41 being put into the fully open state by the throttle opening degree increase control that results in an increase in throttle opening degree. By the opening degrees of the respective valves 41, 53, 54 being controlled in this order, the intake air amount can be increased more quickly to the target air amount depending on the target engine load in the turbocharging region C. Accordingly, the engine load can be raised more quickly to the target engine load in the turbocharging region C.

Figure 6:
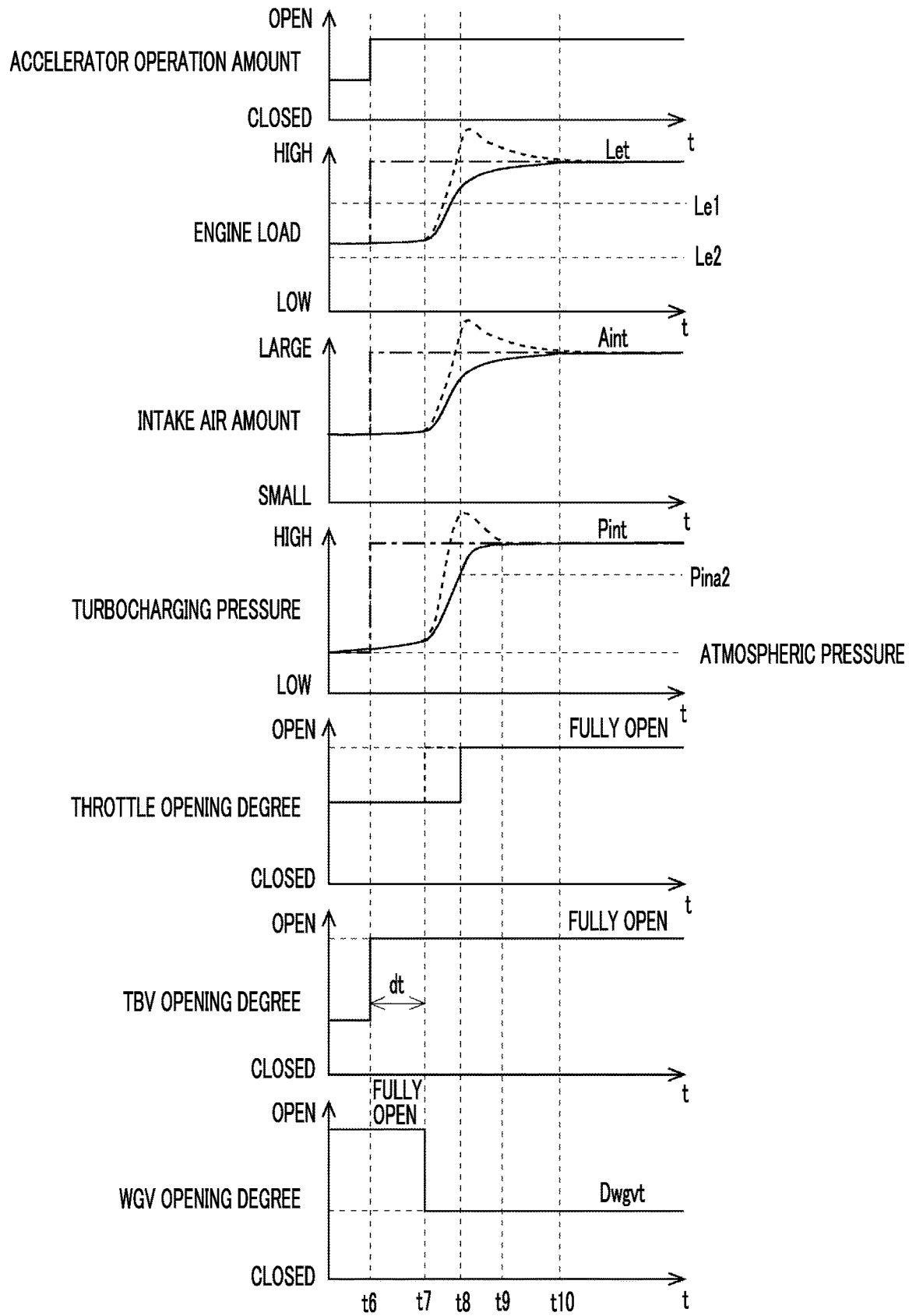
FIG. 6 is a time chart illustrating transitions of the accelerator operation amount, the engine load, the intake air amount, the turbocharging pressure, and each valve opening degree during an acceleration operation in which the operation state of the internal combustion engine according to the example is shifted from a second natural aspiration region to the turbocharging region.

Hereinafter, the control of the opening degrees of the respective valves 41, 53, 54 during the second acceleration control will be described in detail based on FIG. 6. FIG. 6 is a time chart illustrating transitions of the accelerator operation amount, the engine load, the intake air amount, the turbocharging pressure, and the opening degrees of the respective valves 41, 53, 54 during the acceleration operation in which the operation state of the internal combustion engine 1 is shifted from the second natural aspiration region B to the turbocharging region C. The solid lines in FIG. 6 show the transitions of the respective parameters during the execution of the second acceleration control according to the present example. The dashed lines in FIG. 6 show transitions of the respective parameters in a case where the throttle opening degree increase control and the WGV opening degree decrease control are simultaneously executed unlike in the second acceleration control. The one-dot chain lines that are illustrated in FIG. 6 in relation to the engine load, the intake air amount, and the turbocharging pressure show transitions of the target engine load, the target air amount, and the target turbocharging pressure, respectively.

Before time t6 in FIG. 6, the operation state of the internal combustion engine 1 belongs to the second natural aspiration region B. At this time, the throttle opening degree and the TBV opening degree remain controlled such that they are opening degrees depending on the operation state of the internal combustion engine 1. In addition, the WGV 54 remains controlled such that it is in the fully open state. The throttle opening degree at this time is higher than the throttle opening degree at the time when the operation state of the internal combustion engine 1 belongs to the first natural aspiration region A (that is, the throttle opening degree before time t1 in FIG. 5). The TBV opening degree at this time is higher than the TBV opening degree at the time when the operation state of the internal combustion engine 1 belongs to the first natural aspiration region A (that is, the TBV opening degree before time t1 in FIG. 5). At time t6, the accelerator operation amount detected by the accelerator position sensor 15 increases and the acceleration operation is called for. As a result, the target engine load Let exceeds the first predetermined load Le1. In other words, the target engine load Let is shifted to the turbocharging region C. As a result, the target air amount Aint and the target turbocharging pressure Pint increase to the values corresponding to the target engine load Let in the turbocharging region as well.

During the second acceleration control, the TBV 53 is controlled at time t6 such that it is put into the fully open state. At time t6, the WGV 54 maintains its fully open state. Accordingly, the turbocharging pressure rarely rises immediately after time t6. Accordingly, the intake air amount and the engine load rarely rise immediately after time t6. At time t7, which is a point in time that is reached after the predetermined period dt elapses from time t6, the WGV opening degree is reduced and controlled such that it reaches the target WGV opening degree Dwgvt, which corresponds to the target turbocharging pressure Pint in the turbocharging region. At this time, the WGV opening degree is reduced to the target WGV opening degree Dwgvt in a state where the intake air amount is relatively large (that is, in a state where the flow rate of the exhaust gas discharged from the internal combustion engine 1 is relatively high), and thus the rotation speed of the turbine 61 is quickly raised by the energy of the exhaust gas. Accordingly, the turbocharging pressure begins to soar at time t7. As the turbocharging pressure soars, the intake air amount and the engine load begin to soar at time t7 as well.

Once the soaring turbocharging pressure reaches a second predetermined turbocharging pressure threshold Pina2 at time t8, the throttle valve 41 is controlled and reaches the fully open state. The second predetermined turbocharging pressure threshold Pina2 is lower than the target turbocharging pressure Pint (examples of the second predetermined turbocharging pressure threshold Pina2 including 80% of the target turbocharging pressure Pint). As a result, the turbocharging pressure reaches the target turbocharging pressure Pint in turbocharging region C at time t9. Subsequently at time t10, the intake air amount and the engine load reach the target air amount Aint and the target engine load Let in the turbocharging region C, respectively.

In a case where the operation state of the internal combustion engine 1 is shifted from the second natural aspiration region B to the turbocharging region C as described above, the engine load can be more quickly increased to the target engine load Let in the turbocharging region C in a case where the turbocharging pressure is raised to some extent first by the execution of the TBV opening degree increase control and the WGV opening degree decrease control, and then the intake air amount is further increased by the execution of the throttle opening degree increase control than in a case where throttle opening degree increase control is executed before the execution of the TBV opening degree increase control and the WGV opening degree decrease control.

In a case where the throttle valve 41 is controlled such that it is put into the fully open state at the same time as the WGV opening degree is controlled such that it reaches the target WGV opening degree Dwgvt at time t7 as illustrated by the dashed lines in FIG. 6, the pressure of the intake air in the intake manifold 40 rises in response to a rise in turbocharging pressure. Accordingly, in a case where the turbocharging pressure rises as a result of the execution of the WGV opening degree decrease control at time t7 and the turbocharging pressure temporarily exceeds the target turbocharging pressure Pint as a result of its overshooting as illustrated by the dashed line that is illustrated in FIG. 6 in relation to the turbocharging pressure, the pressure of the intake air in the intake manifold 40 rises as a result of the overshooting, and thus the intake air amount may temporarily exceed the target air amount Aint as a result of overshooting as illustrated by the dashed line that is illustrated in FIG. 6 in relation to the intake air amount. In this case, the engine load temporarily exceeds the target engine load Let as a result of overshooting as well. For such an excessive rise in intake air amount and such an excessive rise in engine load to be suppressed, a rise in the pressure of the intake air in the intake manifold 40 needs to be suppressed by the opening degree of the throttle valve 41 being temporarily decreased when the overshooting of the turbocharging pressure occurs. In other words, the opening degree of the throttle valve 41 needs to be temporarily decreased after it is temporarily fully opened at time t7. In this case, the opening degree of the throttle valve 41 is to be further changed subsequently despite the simultaneous execution of the throttle opening degree increase control, the TBV opening degree increase control, and the WGV opening degree decrease control at time t7, and thus the controllability of the throttle valve 41 deteriorates. In this case, in addition, the opening degree of the throttle valve 41 needs to be repeatedly changed in some cases so that the intake air amount converges to the target air amount Aint. In this case, it takes time for the intake air amount to converge to the target air amount Aint. As a result, it takes time for the engine load to converge to the target engine load Let in the turbocharging region C. During the second acceleration control according to the present example, in contrast, the throttle opening degree does not increase and is maintained at an intermediate opening degree immediately after the point in time at which the WGV opening degree is decreased to the target WGV opening degree Dwgvt (that is, time t7 in FIG. 6). Accordingly, the pressure of the intake air in the intake manifold 40 is less likely to rise than when the throttle valve 41 is controlled and remains in the fully open state even if the turbocharging pressure overshoots as a result of the execution of the WGV opening degree decrease control. Accordingly, the intake air amount is unlikely to increase even if the turbocharging pressure overshoots, and thus overshooting of the intake air amount and the engine load can be suppressed. Accordingly, with the second acceleration control according to the present example, the throttle valve 41 can remain intact in terms of controllability and the engine load can be more quickly controlled such that it reaches the target engine load Let in the turbocharging region C.

During the second acceleration control according to the present example, the TBV 53 is controlled at time t6 such that it is put into the fully open state and the WGV opening degree is controlled at time t7, which is reached after the predetermined period dt elapses from time t6, such that it reaches the target WGV opening degree Dwgvt as described above. In other words, the WGV opening degree decrease control is executed after the TBV opening degree increase control as in the case of the first acceleration control. However, the order of the execution of the control is not limited to the above-described order during the second acceleration control as well. Still, as in the case of the first acceleration control, a decrease in WGV opening degree preceding an increase in TBV opening degree may cause the pressure of the exhaust gas on the side of the exhaust gas passage 5 that is upstream of the branching portion 5b to temporarily rise to excess. From the viewpoint of suppressing such an excessive rise in exhaust gas pressure, in some embodiments the TBV opening degree increase control and the WGV opening degree decrease control are simultaneously executed or the WGV opening degree decrease control is executed after the TBV opening degree increase control as described above during the second acceleration control as well.

During the first acceleration control described above, the WGV 54 is controlled such that it temporarily remains in the fully closed state before the opening degree of the WGV 54 is controlled such that it reaches the target WGV opening degree Dwgvt so that the turbocharging pressure is raised as quickly as possible. In a case where the operation state of the internal combustion engine 1 belongs to the second natural aspiration region B, however, the intake air amount is already relatively large at time t7 in FIG. 6 (that is, the flow rate of the exhaust gas discharged from the internal combustion engine 1 is already relatively high). Control of the WGV 54 that leads to the fully closed state of the WGV 54 in such a state may cause the turbocharging pressure to overshoot. Accordingly, from the viewpoint of suppressing the overshooting of the turbocharging pressure, in some embodiments the WGV opening degree decrease control during the second acceleration control is to control the opening degree of the WGV 54 such that it reaches the target WGV opening degree Dwgvt without causing the WGV 54 to be fully closed temporarily.

Control Flow

Figure 7:
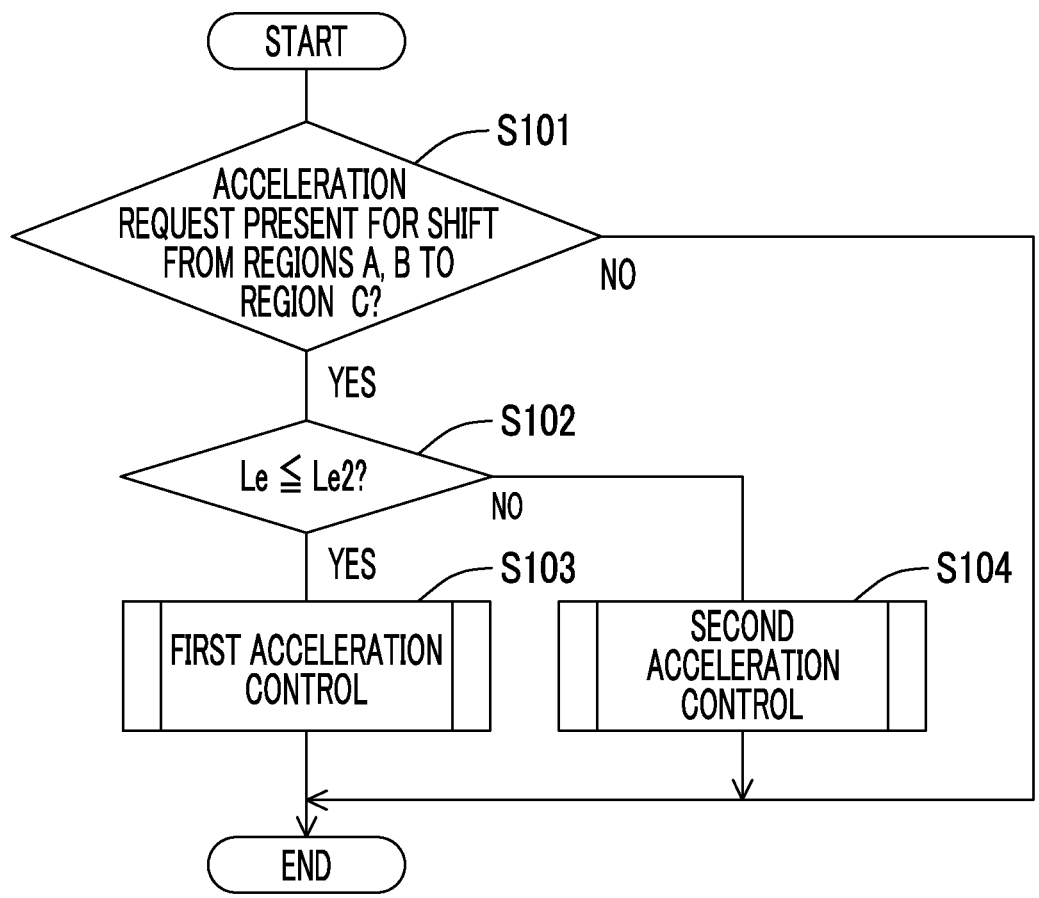
FIG. 7 is a flowchart illustrating a basic control flow regarding a throttle valve, a TBV, and a WGV during an acceleration operation in which the operation state of the internal combustion engine according to the example is shifted from the natural aspiration region to the turbocharging region.
Figure 8:
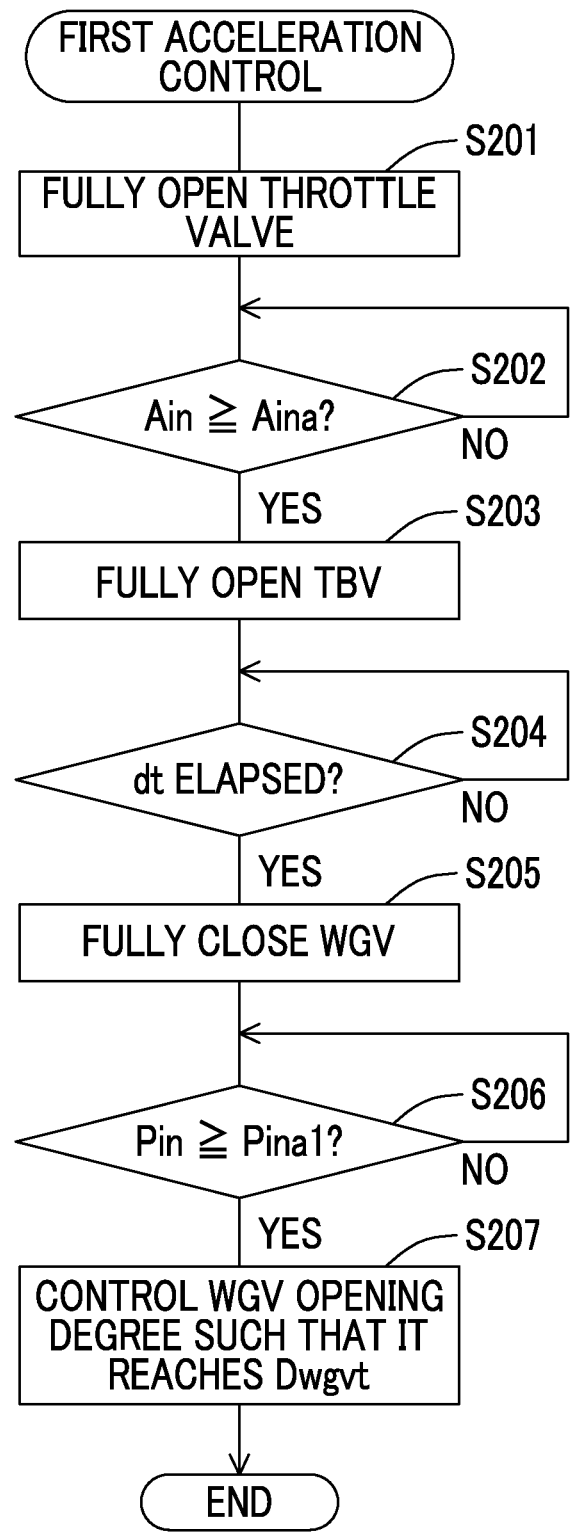
FIG. 8 is a flowchart illustrating a control flow of a first acceleration control according to the example.

The control flow of the throttle valve 41, the TBV 53, and the WGV 54 during the acceleration operations according to the present example in which the operation state of the internal combustion engine 1 is shifted from the natural aspiration regions A, B to the turbocharging region C will be described below based on FIGS. 7 to 9. FIG. 7 is a flowchart illustrating the basic control flow of the above-described valve control. FIG. 8 is a flowchart illustrating the control flow of the first acceleration control that is executed in S103 of the flowchart illustrated in FIG. 7. FIG. 9 is a flowchart illustrating the control flow of the second acceleration control that is executed in S104 of the flowchart illustrated in FIG. 7. The above-described flows are stored in advance in the ECU 10 and executed by the processor of the ECU 10.

In the flow that is illustrated in FIG. 7, the ECU 10 first determines in S101, based on the value detected by the accelerator position sensor 15, whether or not an acceleration request is present for the operation state of the internal combustion engine 1 to be shifted from the natural aspiration regions A, B to the turbocharging region C (that is, whether or not the target engine load is shifted from a value not exceeding the first predetermined load Le1 to a value exceeding the first predetermined load Le1). In a case where a negative determination is made in S101, the execution of this flow is temporarily terminated. In this case, the opening degrees of the respective valves 41, 53, 54 are controlled such that they are the opening degrees depending on the operation state of the internal combustion engine 1 by a control flow that differs from this flow being executed. The correlation between the opening degrees of the respective valves 41, 53, 54 and the operation state of the internal combustion engine 1 is stored in advance in the ECU 10 in the form of a map or a function.

After a positive determination is made in S101, the processing of S102 is executed. In S102, the ECU 10 determines whether or not the engine load Le at the current point in time (that is, a point in time when the operation state of the internal combustion engine 1 belongs to the natural aspiration region) is equal to or lower than a second predetermined load Le2. In a case where a positive determination is made in S102, the ECU 10 is capable of determining that the acceleration operation request is present for the operation state of the internal combustion engine 1 to be shifted to the turbocharging region C in a state where the operation state of the internal combustion engine 1 belongs to the first natural aspiration region A. In this case, the control flow of the first acceleration control that is illustrated in FIG. 8 is executed in S103.

In the control flow of the first acceleration control illustrated in FIG. 8, the throttle valve 41 is fully opened in S201 first. Then, in S202, the ECU 10 determines whether or not the intake air amount Ain that is detected by the air flow meter 43 is equal to or larger than the predetermined air amount threshold Aina. In a case where a negative determination is made in S202, the processing of S202 is executed again.

After a positive determination is made in S202, the TBV 53 is fully opened in S203. Then, in 8204, the ECU 10 determines whether or not the predetermined period dt has elapsed since the TBV 53 was fully opened in S203. In a case where a negative determination is made in S204, the processing of S204 is executed again. After a positive determination is made in S204, the WGV 54 is fully closed in S205. The predetermined period dt is set in advance based on an experiment or the like as a period that allows a temporary and excessive rise in the pressure of the exhaust gas on the side of the exhaust gas passage 5 that is upstream of the branching portion 5b to be suppressed by the WGV opening degree being decreased before the TBV opening degree is increased. During the first acceleration control, the TBV 53 may be fully opened and the WGV 54 may be fully closed at the same time in S203 as described above insofar as a temporary rise in the pressure of the exhaust gas on the side of the exhaust gas passage 5 that is upstream of the branching portion 5b is within an allowable range.

The processing of S206 is executed after S205. In S206, the ECU 10 determines whether or not a turbocharging pressure Pin is equal to or higher than the first predetermined turbocharging pressure threshold Pina1. In a case where a negative determination is made in S206, the processing of S206 is executed again. After a positive determination is made in S206, the WGV opening degree is controlled in S207 such that it reaches the target WGV opening degree Dwgvt in the turbocharging region C. In S205, the WGV opening degree may be controlled such that it reaches the target WGV opening degree Dwgvt in the turbocharging region C without the WGV 54 being fully closed temporarily as described above. Then, the execution of this flow is terminated and the execution of the flow that is illustrated in FIG. 7 is temporarily terminated as well.

In a case where a negative determination is made in S102 of the flow that is illustrated in FIG. 7, the ECU 10 is capable of determining that the acceleration operation request is present for the operation state of the internal combustion engine 1 to be shifted to the turbocharging region C in a state where the operation state of the internal combustion engine 1 belongs to the second natural aspiration region B. In this case, the control flow of the second acceleration control that is illustrated in FIG. 9 is executed in S104.

In the control flow of the second acceleration control illustrated in FIG. 9, the TBV 53 is fully opened in S301 first. Then, in S302, the ECU 10 determines whether or not the predetermined period dt has elapsed since the TBV 53 was fully opened in S301. The predetermined period dt is similar to the predetermined period dt in S204 of the flow that is illustrated in FIG. 8. In a case where a negative determination is made in S302, the processing of S302 is executed again. After a positive determination is made in S302, the WGV 54 is controlled in S303 such that it reaches the target WGV opening degree Dwgvt in the turbocharging region C. During the second acceleration control as well as the first acceleration control, the TBV 53 may be fully opened and the WGV 54 may be controlled such that it reaches the target WGV opening degree Dwgvt in the turbocharging region C at the same time in S301 as described above insofar as a temporary rise in the pressure of the exhaust gas on the side of the exhaust gas passage 5 that is upstream of the branching portion 5b is within an allowable range.

The processing of S304 is executed after S303. In S304, the ECU 10 determines whether or not the turbocharging pressure Pin is equal to or higher than the second predetermined turbocharging pressure threshold Pina2. In a case where a negative determination is made in S304, the processing of S304 is executed again. After a positive determination is made in S304, the throttle valve 41 is fully opened in S305. Then, the execution of this flow is terminated and the execution of the flow that is illustrated in FIG. 7 is temporarily terminated as well.

In the above-described flow, the TBV opening degree increase control and the WGV opening degree decrease control are executed after the throttle opening degree increase control is executed in the case of the acceleration operation for the operation state of the internal combustion engine 1 to be shifted from the first natural aspiration region A to the turbocharging region C. In the case of the acceleration operation for the operation state of the internal combustion engine 1 to be shifted from the second natural aspiration region B to the turbocharging region C, the throttle opening degree increase control is executed after the TBV opening degree increase control and the WGV opening degree decrease control are executed. By the opening degrees of the respective valves 41, 53, 54 being controlled in this execution order, the engine load can be more quickly increased to the target engine load Let in the turbocharging region C in any case. Accordingly, responsiveness during the acceleration operations in which the operation state of the internal combustion engine 1 is shifted from the natural aspiration regions A, B to the turbocharging region C can be improved.

In the above-described example, the throttle opening degree increase control has been described as a control causing the throttle valve 41 to be fully opened and the TBV opening degree increase control has been described as a control causing the TBV 53 to be fully opened. In other words, both the target throttle opening degree during the throttle opening degree increase control and the target TBV opening degree during the TBV opening degree increase control are full opening. However, the target opening degrees do not have to be full opening. In the above-described control, the opening degrees of the valves 41, 53 may be increased to opening degrees determined in advance as the target throttle opening degree and the target TBV opening degree in the turbocharging region C, respectively.

What is claimed is:

1. A control system for an internal combustion engine, the control system comprising:
    an exhaust gas passage of the internal combustion engine;
    an intake passage of the internal combustion engine;
    a turbocharger including a turbine disposed on the exhaust gas passage and a compressor disposed on the intake passage;
    a bypass passage branching from the exhaust gas passage at a portion located upstream of the turbine and merging with the exhaust gas passage at a portion located downstream of the turbine;
    a waste gate valve disposed on the bypass passage, the waste gate valve being configured to change a sectional area of an exhaust gas flow path in the bypass passage;
    a turbo bypass valve disposed in the exhaust gas passage between a portion where the bypass passage branches from the exhaust gas passage and a portion where the bypass passage merges with the exhaust gas passage, the turbo bypass valve being configured to change a sectional area of an exhaust gas flow path in the exhaust gas passage passing through the turbine;
    a throttle valve disposed on the intake passage and provided downstream of the compressor, the throttle valve being configured to change a sectional area of an intake air flow path in the intake passage; and
    an electronic control unit configured to:
        control an opening degree of the throttle valve such that the opening degree of the throttle valve increases to a target throttle opening degree in a turbocharging region, control an opening degree of the waste gate valve such that the opening degree of the waste gate valve decreases to a target waste gate valve opening degree in the turbocharging region, and control an opening degree of the turbo bypass valve such that the opening degree of the turbo bypass valve increases to a target turbo bypass valve opening degree in the turbocharging region when a predetermined acceleration request is present for an operation state of the internal combustion engine to be shifted from a natural aspiration region to the turbocharging region, the natural aspiration region being an operation region where an engine load is equal to or lower than a first predetermined load and a natural aspiration operation being performed in the natural aspiration region and the turbocharging region being an operation region where the engine load is higher than the first predetermined load and a turbocharging operation being performed in the turbocharging region;
        control the opening degree of the waste gate valve such that the opening degree of the waste gate valve decreases to the target waste gate valve opening degree in the turbocharging region and control the opening degree of the turbo bypass valve such that the opening degree of the turbo bypass valve increases to the target turbo bypass valve opening degree in the turbocharging region after controlling the opening degree of the throttle valve such that the opening degree of the throttle valve increases to the target throttle opening degree in a case where the operation state of the internal combustion engine is shifted to the turbocharging region from a region where the engine load in the natural aspiration region is equal to or lower than a second predetermined load lower than the first predetermined load when the predetermined acceleration request is present; and
        control the opening degree of the throttle valve such that the opening degree of the throttle valve increases to the target throttle opening degree after controlling the opening degree of the waste gate valve such that the opening degree of the waste gate valve decreases to the target waste gate valve opening degree in the turbocharging region and controlling the opening degree of the turbo bypass valve such that the opening degree of the turbo bypass valve increases to the target turbo bypass valve opening degree in the turbocharging region in a case where the operation state of the internal combustion engine is shifted to the turbocharging region from a region where the engine load in the natural aspiration region is higher than the second predetermined load.

2. The control system according to claim 1, wherein the electronic control unit is configured to control the opening degree of the waste gate valve such that the opening degree of the waste gate valve reaches the target waste gate valve opening degree after fully closing the waste gate valve temporarily in a case where the operation state of the internal combustion engine is shifted to the turbocharging region from the region where the engine load in the natural aspiration region is equal to or lower than the second predetermined load when the predetermined acceleration request is present.

3. The control system according to claim 1, wherein the electronic control unit simultaneously executes the control causing the opening degree of the waste gate valve to decrease to the target waste gate valve opening degree in the turbocharging region and the control causing the opening degree of the turbo bypass valve to increase to the target turbo bypass valve opening degree in the turbocharging region when the predetermined acceleration request is present.

4. The control system according to claim 1, wherein the electronic control unit controls the opening degree of the waste gate valve such that the opening degree of the waste gate valve decreases to the target waste gate valve opening degree in the turbocharging region after controlling the opening degree of the turbo bypass valve such that the opening degree of the turbo bypass valve increases to the target turbo bypass valve opening degree in the turbocharging region when the predetermined acceleration request is present.

* * * * *